(12) United States Patent
Ketchum et al.

(10) Patent No.: US 8,468,561 B2
(45) Date of Patent: Jun. 18, 2013

(54) PREEMPTIBLE STATION INVENTORY

(75) Inventors: Russell Kevin Ketchum, Newport Beach, CA (US); Chad Edward Steelberg, Newport Beach, CA (US); Ryan Scott Steelberg, Irvine, CA (US); Scott Ari Silverman, Laguna Beach, CA (US)

(73) Assignee: Google Inc., Mountain View, CA (US)

( * ) Notice: Subject to any disclaimer, the term of this patent is extended or adjusted under 35 U.S.C. 154(b) by 1215 days.

(21) Appl. No.: 11/502,592

(22) Filed: Aug. 9, 2006

(65) Prior Publication Data
US 2008/0040739 A1 Feb. 14, 2008

(51) Int. Cl.
*G06Q 30/00* (2012.01)
*H04N 7/10* (2006.01)
*H04N 7/025* (2006.01)

(52) U.S. Cl.
USPC ........... 725/32; 724/34; 705/14.4; 705/14.43; 705/14.49

(58) Field of Classification Search
None
See application file for complete search history.

(56) References Cited

U.S. PATENT DOCUMENTS

| | | | |
|---|---|---|---|
| 4,517,562 A | 5/1985 | Martinez | |
| 5,096,195 A | 3/1992 | Gimmon | |
| 5,260,778 A | 11/1993 | Kauffman et al. | |
| 5,404,566 A | 4/1995 | Wehrmeyer | |
| 5,408,686 A | 4/1995 | Mankovitz | |
| 5,422,624 A | 6/1995 | Smith | |
| 5,504,482 A | 4/1996 | Schreder | |
| 5,515,098 A | 5/1996 | Carles | |
| 5,557,541 A | 9/1996 | Schulhof et al. | |
| 5,576,755 A | 11/1996 | Davis et al. | |
| 5,583,200 A | 12/1996 | Larue et al. | |
| 5,600,366 A | 2/1997 | Schulman | |
| 5,649,300 A | 7/1997 | Snyder et al. | |
| 5,664,948 A | 9/1997 | Dimitriadis et al. | |
| 5,697,844 A | 12/1997 | Von Kohorn | |
| 5,712,985 A | 1/1998 | Lee et al. | |
| 5,715,018 A | 2/1998 | Fasciano et al. | |
| 5,724,521 A | 3/1998 | Dedrick | |
| 5,738,583 A | 4/1998 | Comas et al. | |
| 5,774,170 A * | 6/1998 | Hite et al. ........................ 725/34 |
| 5,806,018 A | 9/1998 | Smith et al. | |
| 5,837,680 A | 11/1998 | Moses et al. | |
| 5,948,061 A | 9/1999 | Merriman et al. | |
| 5,999,808 A | 12/1999 | LaDue | |

(Continued)

FOREIGN PATENT DOCUMENTS

EP 1 032 148 8/2000
EP 01026610 8/2000

(Continued)

OTHER PUBLICATIONS

Zeff, R. and Aronson, B., "*Advertising on the Internet*," second edition, pp. 1-436 (1999).

(Continued)

*Primary Examiner* — Mark D Featherstone
(74) *Attorney, Agent, or Firm* — Fish & Richardson P.C.

(57) ABSTRACT

Methods, apparatus, systems, processes, engines and computer program products are provided for preempting advertisements in a broadcast. In one exemplary system, a method is provided that includes determining one or more advertisements in a schedule that are available for preemption, identifying rules for preempting advertisements and automatically preempting the one or more advertisements using an advertisement from available inventory if the rules are satisfied.

25 Claims, 9 Drawing Sheets

U.S. PATENT DOCUMENTS

| | | | |
|---|---|---|---|
| 6,011,973 A | 1/2000 | Valentine et al. | |
| 6,025,331 A | 2/2000 | Moses et al. | |
| 6,029,045 A | 2/2000 | Picco et al. | |
| 6,104,815 A | 8/2000 | Alcorn et al. | |
| 6,167,382 A | 12/2000 | Sparks et al. | |
| 6,198,906 B1 | 3/2001 | Boetje et al. | |
| 6,212,392 B1 | 4/2001 | Fitch et al. | |
| 6,236,365 B1 | 5/2001 | LeBlanc et al. | |
| 6,282,548 B1 | 8/2001 | Burner et al. | |
| 6,286,005 B1 | 9/2001 | Cannon | |
| 6,298,218 B1 | 10/2001 | Lowe et al. | |
| 6,311,214 B1 | 10/2001 | Rhoads | |
| 6,338,043 B1 | 1/2002 | Miller | |
| 6,374,177 B1 | 4/2002 | Lee et al. | |
| 6,388,712 B1 | 5/2002 | Shinohara et al. | |
| 6,389,467 B1 | 5/2002 | Eyal | |
| 6,401,075 B1 | 6/2002 | Mason et al. | |
| 6,411,992 B1 | 6/2002 | Srinivasan et al. | |
| 6,416,414 B1 | 7/2002 | Stadelmann | |
| 6,425,127 B1* | 7/2002 | Bates et al. | 725/32 |
| 6,430,603 B2 | 8/2002 | Hunter | |
| 6,470,180 B1 | 10/2002 | Kotzin et al. | |
| 6,502,076 B1 | 12/2002 | Smith | |
| 6,505,169 B1* | 1/2003 | Bhagavath et al. | 705/14.66 |
| 6,508,710 B1 | 1/2003 | Paravia et al. | |
| 6,509,867 B1 | 1/2003 | McGibney | |
| 6,526,275 B1 | 2/2003 | Calvert | |
| 6,527,638 B1 | 3/2003 | Walker et al. | |
| 6,527,641 B1 | 3/2003 | Sinclair et al. | |
| 6,587,127 B1 | 7/2003 | Leeke et al. | |
| 6,594,498 B1 | 7/2003 | McKenna et al. | |
| 6,606,745 B2 | 8/2003 | Maggio | |
| 6,628,928 B1 | 9/2003 | Crosby et al. | |
| 6,628,939 B2 | 9/2003 | Paulsen | |
| 6,650,892 B1 | 11/2003 | Thiriet | |
| 6,674,995 B1 | 1/2004 | Meyers et al. | |
| 6,678,501 B1 | 1/2004 | Valeski | |
| 6,698,020 B1 | 2/2004 | Zigmond et al. | |
| 6,701,355 B1 | 3/2004 | Brandt et al. | |
| 6,704,930 B1 | 3/2004 | Eldering et al. | |
| 6,711,474 B1 | 3/2004 | Treyz et al. | |
| 6,735,435 B2 | 5/2004 | Newell et al. | |
| 6,741,856 B2 | 5/2004 | McKenna et al. | |
| 6,747,706 B1 | 6/2004 | Geddes et al. | |
| 6,767,284 B1 | 7/2004 | Koza | |
| 6,772,213 B2 | 8/2004 | Glorikian | |
| 6,778,820 B2 | 8/2004 | Tendler | |
| 6,820,055 B2 | 11/2004 | Saindon et al. | |
| 6,820,277 B1 | 11/2004 | Eldering et al. | |
| 6,839,680 B1 | 1/2005 | Liu et al. | |
| 6,850,839 B1 | 2/2005 | McGibney | |
| 6,895,238 B2 | 5/2005 | Newell et al. | |
| 6,915,107 B1 | 7/2005 | Lusk | |
| 6,941,324 B2 | 9/2005 | Plastina et al. | |
| 6,950,623 B2 | 9/2005 | Brown et al. | |
| 6,952,181 B2 | 10/2005 | Karr et al. | |
| 6,952,559 B2 | 10/2005 | Bates et al. | |
| 6,957,041 B2 | 10/2005 | Christensen et al. | |
| 6,961,549 B2 | 11/2005 | Mori | |
| 6,975,835 B1 | 12/2005 | Lake et al. | |
| 6,985,882 B1 | 1/2006 | Del Soto | |
| 7,036,136 B1 | 4/2006 | Worthy | |
| 7,039,930 B1 | 5/2006 | Goodman et al. | |
| 7,039,932 B2 | 5/2006 | Eldering | |
| 7,054,592 B2 | 5/2006 | Tatsumi et al. | |
| 7,068,398 B2 | 6/2006 | Rijavec | |
| 7,069,582 B2 | 6/2006 | Philyaw et al. | |
| 7,085,732 B2 | 8/2006 | Gould | |
| 7,130,623 B2 | 10/2006 | Kirkeby et al. | |
| 7,130,807 B1 | 10/2006 | Mikurak | |
| 7,158,753 B2 | 1/2007 | Kagan et al. | |
| 7,185,353 B2 | 2/2007 | Schlack | |
| 2001/0003099 A1 | 6/2001 | Von Kohorn | |
| 2001/0034772 A1 | 10/2001 | Fisher et al. | |
| 2001/0042019 A1 | 11/2001 | Omachi | |
| 2001/0048748 A1 | 12/2001 | Van Ryzin | |
| 2001/0051559 A1 | 12/2001 | Cohen et al. | |
| 2001/0055954 A1 | 12/2001 | Cheng | |
| 2002/0013757 A1 | 1/2002 | Bykowsky et al. | |
| 2002/0023020 A1 | 2/2002 | Kenyon et al. | |
| 2002/0032019 A1 | 3/2002 | Marks et al. | |
| 2002/0038455 A1 | 3/2002 | Srinivasan et al. | |
| 2002/0049037 A1 | 4/2002 | Christensen et al. | |
| 2002/0049717 A1 | 4/2002 | Routtenberg et al. | |
| 2002/0056118 A1 | 5/2002 | Hunter et al. | |
| 2002/0059619 A1 | 5/2002 | Lebar | |
| 2002/0059646 A1 | 5/2002 | Kim | |
| 2002/0069404 A1 | 6/2002 | Copeman et al. | |
| 2002/0083439 A1 | 6/2002 | Eldering | |
| 2002/0087532 A1 | 7/2002 | Barritz et al. | |
| 2002/0092019 A1 | 7/2002 | Marcus | |
| 2002/0095339 A1 | 7/2002 | Galloway | |
| 2002/0099600 A1 | 7/2002 | Merriman et al. | |
| 2002/0100055 A1 | 7/2002 | Zeidman | |
| 2002/0116517 A1 | 8/2002 | Hudson et al. | |
| 2002/0119752 A1 | 8/2002 | Bates et al. | |
| 2002/0132575 A1 | 9/2002 | Kesling et al. | |
| 2002/0138831 A1* | 9/2002 | Wachtfogel et al. | 725/32 |
| 2002/0151272 A1 | 10/2002 | Simon | |
| 2002/0168967 A1 | 11/2002 | Clapper | |
| 2002/0178058 A1 | 11/2002 | Ritchie et al. | |
| 2002/0178445 A1 | 11/2002 | Eldering et al. | |
| 2002/0194598 A1 | 12/2002 | Connelly | |
| 2003/0014483 A1 | 1/2003 | Stevenson et al. | |
| 2003/0023489 A1 | 1/2003 | McGuire et al. | |
| 2003/0028451 A1 | 2/2003 | Ananian | |
| 2003/0032409 A1 | 2/2003 | Hutcheson et al. | |
| 2003/0033292 A1 | 2/2003 | Meisel et al. | |
| 2003/0055816 A1 | 3/2003 | Paine et al. | |
| 2003/0069032 A1 | 4/2003 | Jarvi et al. | |
| 2003/0070167 A1 | 4/2003 | Holtz et al. | |
| 2003/0084283 A1 | 5/2003 | Pixton | |
| 2003/0093530 A1 | 5/2003 | Syed | |
| 2003/0093790 A1 | 5/2003 | Logan et al. | |
| 2003/0093792 A1 | 5/2003 | Labeeb et al. | |
| 2003/0101454 A1 | 5/2003 | Ozer et al. | |
| 2003/0105809 A1 | 6/2003 | Yoshii et al. | |
| 2003/0119528 A1 | 6/2003 | Pew et al. | |
| 2003/0139190 A1 | 7/2003 | Steelberg et al. | |
| 2003/0149988 A1 | 8/2003 | Ellis et al. | |
| 2003/0172376 A1 | 9/2003 | Coffin | |
| 2003/0182266 A1 | 9/2003 | Stern | |
| 2003/0194199 A1 | 10/2003 | Roth | |
| 2003/0225641 A1 | 12/2003 | Gritzmacher et al. | |
| 2003/0226141 A1 | 12/2003 | Krasnow et al. | |
| 2003/0226142 A1* | 12/2003 | Rand | 725/32 |
| 2003/0229559 A1 | 12/2003 | Panttaja et al. | |
| 2004/0019497 A1 | 1/2004 | Volk et al. | |
| 2004/0028388 A1 | 2/2004 | Kataoka et al. | |
| 2004/0038723 A1 | 2/2004 | Schneier et al. | |
| 2004/0054589 A1 | 3/2004 | Nicholas et al. | |
| 2004/0064524 A1 | 4/2004 | Van Steenbergen et al. | |
| 2004/0073915 A1 | 4/2004 | Dureau | |
| 2004/0083133 A1 | 4/2004 | Nicholas et al. | |
| 2004/0093394 A1 | 5/2004 | Weber et al. | |
| 2004/0103026 A1 | 5/2004 | White | |
| 2004/0117826 A1 | 6/2004 | Karaoguz et al. | |
| 2004/0117831 A1 | 6/2004 | Ellis et al. | |
| 2004/0127199 A1 | 7/2004 | Kagan et al. | |
| 2004/0152493 A1 | 8/2004 | Phillips et al. | |
| 2004/0177003 A1 | 9/2004 | Liao et al. | |
| 2004/0177383 A1 | 9/2004 | Martinolich et al. | |
| 2004/0194131 A1 | 9/2004 | Ellis et al. | |
| 2004/0198217 A1 | 10/2004 | Lee et al. | |
| 2004/0203759 A1 | 10/2004 | Shaw et al. | |
| 2004/0205829 A1 | 10/2004 | Hane, III. | |
| 2004/0215515 A1 | 10/2004 | Perry | |
| 2004/0237102 A1 | 11/2004 | Konig et al. | |
| 2004/0244042 A1 | 12/2004 | Billmaier | |
| 2004/0255230 A1 | 12/2004 | Chen et al. | |
| 2005/0015800 A1 | 1/2005 | Holcomb | |
| 2005/0020209 A1 | 1/2005 | Camp, Jr. | |
| 2005/0020238 A1 | 1/2005 | Eastman et al. | |
| 2005/0021396 A1 | 1/2005 | Pearch et al. | |
| 2005/0021521 A1 | 1/2005 | Wycoff | |
| 2005/0038749 A1* | 2/2005 | Fitch et al. | 705/51 |
| 2005/0039206 A1 | 2/2005 | Opdycke et al. | |

| | | | |
|---|---|---|---|
| 2005/0044561 A1 | 2/2005 | McDonald | |
| 2005/0099600 A1 | 2/2005 | Opdycke | |
| 2005/0065806 A1 | 3/2005 | Harik | |
| 2005/0065844 A1 | 3/2005 | Raj et al. | |
| 2005/0090279 A9 | 4/2005 | Witkowski et al. | |
| 2005/0105725 A1 | 5/2005 | Lee | |
| 2005/0137958 A1 | 6/2005 | Huber et al. | |
| 2005/0146990 A1 | 7/2005 | Mayer | |
| 2005/0169114 A1 | 8/2005 | Ahn | |
| 2005/0188402 A1 | 8/2005 | De Andrade et al. | |
| 2005/0198317 A1 | 9/2005 | Byers | |
| 2005/0229202 A1 | 10/2005 | Berstis | |
| 2005/0239402 A1 | 10/2005 | Gioscia et al. | |
| 2005/0266796 A1 | 12/2005 | Steelberg et al. | |
| 2005/0267817 A1 | 12/2005 | Barton et al. | |
| 2005/0289630 A1 | 12/2005 | Andrews et al. | |
| 2006/0026067 A1 | 2/2006 | Nicholas et al. | |
| 2006/0179462 A1 | 8/2006 | Willame et al. | |
| 2006/0195863 A1 | 8/2006 | Whymark | |
| 2007/0067297 A1 | 3/2007 | Kublickis | |
| 2007/0157261 A1 | 7/2007 | Steelberg | |
| 2011/0178877 A1* | 7/2011 | Swix et al. | 705/14.69 |

FOREIGN PATENT DOCUMENTS

| | | |
|---|---|---|
| JP | 03-184486 | 8/1991 |
| JP | 05-284162 | 10/1993 |
| JP | 09-018430 | 1/1997 |
| JP | 2002-368704 | 12/2002 |
| WO | WO 93/15466 | 8/1993 |
| WO | WO 97/21183 | 6/1997 |
| WO | WO 99/33076 | 7/1999 |
| WO | WO 99/49663 | 9/1999 |
| WO | WO 0001149 A1 * | 1/2000 |
| WO | WO00/64165 | 10/2000 |
| WO | WO 01/35667 | 5/2001 |
| WO | WO 02/01869 | 1/2002 |
| WO | WO 02/23773 | 3/2002 |
| WO | WO 02/25467 | 3/2002 |
| WO | WO 02/27425 | 4/2002 |
| WO | WO 2004/017163 | 2/2004 |

OTHER PUBLICATIONS

Langheinrich, M., et al., "Unintrusive Customization Techniques for Web Advertising" NEC Corporation, C&C Media Research Laboratories. Japan [Online], [retrieved on Apr. 1, 2008]. Retrieved from the Internet <URL:http://web.archive.org/web/20000819020800/www.ccrl.com/adwiz/adwiz-www8.html>.

Adknowledge Primary Services, Customer Reference Guide. pp. 1-90, 2000.

Accipiter, Inc., "Accipiter announces Accipiter AdManager, a breakthrough in Internet advertising and marketing" [Online], [retrieved on Apr. 1, 2008]. Retrieved from the Internet <URL: http://web.archive.org/web/19980201092220/www.accipiter.com/press/releases/pr_adman10.htm> Sep. 9, 1996.

Engage Technologies, Accipiter, "Questions and Answers about using Accipiter AdManager with Engage Precision Profiles" [Online], [retrieved on Apr. 1, 2008]. Retrieved from the Internet <URL:http://web.archive.org/web/19990209022600/www.accipiter.com/products/admanager/adm_profilesfaq.htm> Feb. 9, 1999.

Engage Technologies, Accipiter, "AdManager Frequently Asked Questions." [Online], [retrieved Apr. 1, 2008]. Retrieved from the Internet <URL:http://web.archive.org/web/19990208222457/www.accipiter.com/products/admanager/adm_faq.htm> Feb. 8, 1999.

Aaddzz Brokers Web Ad Space Sales Between Advertisers & Publishers, "The Best Way to Buy and Sell Web Advertising Space," 1997. [online] Retrieved from the Internet: <URL:http://www.aaddzz.com>.

Adforce, User Guide Version 2.6, "A Complete Guide to AdForce," 1998.

AdKnowledge Corporate Information, Company Overview, [online retrieved Aug. 16, 2007] Retrieved from <URL:http://web.archive.org/web/19990128143110/www.adknowledge.com/corporate/index.html>.

Adknowledge Customers, i-traffic, [Online], [retrieved Aug. 16, 2007] Retrieved from the Internet: <URLhttp://web.archive.org/web/19990503093107/www.adknowledge.com/aksystem/profile_itraffic.html>.

ADWIZ by NEC, "The Artificial Intelligence Solution for Advertisement Targeting," [Online], [retrieved Apr. 1, 2008] Retrieved from the Internet: <URL:http://web.archive.org/web/20000816042946/http://www.ccrl.com/adwiz/>.

AdKnowledge, Inc., Campaign Manager, "Streamlines buying and trafficking while saving time and money," [Online], [retrieved Aug. 16, 2007] Retrieved from the internet: <URL:http://web.archive.org/web/19990221080152/www.adknowledge.com/aksystem/campaign.html>.

NEC Corporation, "ADWIZ Intelligent Advertisement Targeting,".

Information Access Technologies, Inc., Aaddzz Highlights: The Maximum Performance Ad Network, "Aaddzz brokers Web ad space between advertisers & publishers," 1997 [Online], [retrieved Apr. 15, 2008] Retrieved from the Internet: <URL:http://web.archive.org/web/19980130092746/www.aaddzz.com/pages/b-highlights>.

Information Access Technologies, Inc., "Introduction to Aaddzz," [Online], [retrieved Apr. 15, 2008] Retrieved from the Internet: <URL:http://web.archive.org/web/19980130092752/www.aaddzz.com/pages/b-intro>.

Information Access Technologies, Inc., "Aaddzz Publishers," [Online], [retrieved Apr. 15, 2008] Retrieved from the Internet: <URL:http://web.archive.org/web/19980130092758/www.aaddzz.com/pages/b-publish>.

Information Access Technologies, Inc., "Aaddzz Advertisers," [Online], [retrieved Apr. 15, 2008] Retrieved from the Internet: <URL:http://web.archive.org/web/19980130092804/www.aaddzz.com/pages/b-advertise>.

Information Access Technologies, Inc., Aaddzz Ads, Spaces, & Places [Online], [retrieved Apr. 14, 2008] Retrieved from the Internet: <URL:http://web.archive.org/web/19980130092810/www.aaddzz.com/pages/b-adspacesplaces>.

Information Access Technologies, Inc., "Aaddzz Real-Time Reporting & Statements," [Online], [retrieved Apr. 15, 2008] Retrieved from the Internet: <URL:http://web.archive.org/web/19980130092816/www.aaddzz.com/pages/b-realtime>.

Information Access Technologies, Inc., "Aaddzz Buying Ad Space with Aaddzz," [Online], [retrieved Apr. 15, 2008] Retrieved from the Internet: <URL:http://web.archive.org/web/19980130092822/www.aaddzz.com/pages/advertising>.

Information Access Technologies, Inc., "Aaddzz Selling Ad Space With Aaddzz," [Online], [retrieved Apr. 15, 2008] Retrieved from the Internet: <URL:http://web.archive.org/web/19980130092829/www.aaddzz.com/pages/selling>.

Information Access Technologies, Inc., "Aaddzz Fees and Payments," [Online], [retrieved Apr. 15, 2008] Retrieved from the Internet: <URL:http://web.archive.org/web/19980130092836/www.aaddzz.com/pages/pricing>.

Information Access Technologies, Inc., "Aaddzz Ratings," [Online], [retrieved Apr. 15, 2008] Retrieved from the Internet: <URL:http://web.archive.org/web/19980130092842/www.aaddzz.com/pages/ratings>.

Information Access Technologies, Inc., "Aaddzz Ad Sizes," [Online], [retrieved Apr. 15, 2008] Retrieved from the Internet: <URL:http://web.archive.org/web/19980130092848/www.aaddzz.com/pages/sizes>.

Information Access Technologies, Inc., "Aaddzz Free Access Reports," [Online], [retrieved Apr. 15, 2008] Retrieved from the Internet: <URL:http://web.archive.org/web/19980130092902/www.aaddzz.com/pages/reports>.

Information Access Technologies, Inc., "Aaddzz Advanced Topics," [Online], [retrieved Apr. 15, 2008] Retrieved from the Internet: <URL:http://web.archive.org/web/19980130092908/www.aaddzz.com/pages/advanced>.

Information Access Technologies, Inc., "Aaddzz Frequently Asked Questions," [Online], [retrieved Apr. 15, 2008] Retrieved from the Internet: <URL:http://web.archive.org/web/19980130092914/www.aaddzz.com/pages/faq>.

Information Access Technologies, Inc., "Aaddzz Home Page," [Online], [retrieved Apr. 15, 2008] Retrieved from the Internet: <URL:http://www.aaddzz.com/letter.html>.

NEC Corporation, NEC: Press Release "NEC announces ADWIZ, an Artificial Intelligence Solution for Advertisement Targeting Software on the World Wide Web," Jan. 8, 1999.

AdKnowledge Inc., "Comprehensive Planning," [Online], [retrieved on Aug. 16, 2007] Retrieved from the Internet: <URL:http://web.archive.org/web/19990221144457/www.adknowledge.com/aksystem/planner.html>.

AdKnowledge Inc., "Automates the targeting and serving of web advertising campaigns," [Online], [retrieved on Aug. 16, 2007] Retrieved from the Internet: <URL:http://web.archive.org/web/19990222023416/www.adknowledge.com/aksystem/smartbanner.html>.

IEEE Intelligent Systems, New Products, "Tell your computer where to go," United Kingdom, Jan./Feb. 1998.

AdKnowledge Inc., "The AdKnowledge System," [Online], [retrieved on Aug. 16, 2007] Retrieved from the Internet: <URL:http://web.archive.org/web/19990221115917/www.adknowledge.com/aksystem/index.html>.

AdKnowledge Inc., Corporate Information "AdKnowledge Events," [Online], [retrieved on Aug. 16, 2007] Retrieved from the Internet: <URL:http://web.archive.org/web/20000511005235/www.adknowledge.com/whatsnew/events.html>.

NEC Corporation, ADWIZ White Paper, "Taking Online Ad Targeting to the Next Level," [Online], [retrieved on Apr. 15, 2008] Retrieved from the Internet: <URL:http://web.archive.org/web/20010619222015/www.ccrl.com/adwiz/whitepaper.html>.

ScanScout, "ScanScout in the News," [Online], [retrieved Apr. 16, 2008]. Retrieved from the Internet: <URL:http://scanscout.com/>.

Blinkx, "Video Search Engine—Blinkx," [Online], [retrieved Apr. 16, 2008]. Retrieved from the Internet: <URL:http://blinkx.com/>.

EveryZing, Inc., "Video SEO and Multimedia Search Solutions," [Online], [retrieved Apr. 16, 2008], Retrieved from the Internet: <URL:http://everyzing.com/>.

Inside Online Video, "Blinkx to Contextualize Video Ads Through Speech Recognition," Jun. 22, 2007 [Online], [retrieved Apr. 16, 2008] Retrieved from the Internet: <URL:http://www.insideonlinevideo.com/20007/06/22/blinkx-to-contextualize-video-ads-through-speech-recognition/>.

Communication pursuant to Article 94(3) EPC for corresponding European Application No. 07813960.7, mailed Sep. 24, 2010, 6 pages.

Supplemental European Search Report dated Aug. 26, 2010 issued in EP Application No. 2050059, 3 pages.

Authorized Officer B. Copenheaver, International Search Report and Written Opinion in International Application No. PCT/US06/09797, Aug. 23, 2007, 9 pages.

Authorized Officer B. Copenheaver, International Search Report and Written Opinion in International Application No. PCT/US06/18971, Oct. 3, 2007, 10 pages.

Authorized Officer B. Giffo-Schmitt. International Preliminary Report on Patentability in International Application No. PCT/US2007/075628, dated Feb. 19, 2009, 5 pages.

Authorized Officer G. Robinson, International Search Report and Written Opinion in International Application No. PCT/US06/09401, Sep. 22, 2006, 8 pages.

Authorized Officer H. Quach, International Search Report in International Application No. PCT/US02/04769, Jul. 23, 2002, 2 pages.

Authorized Officer H. Quach, International Search Report in International Application No. PCT/US02/19983, Oct. 18, 2002, 1 page.

Authorized Officer J. Carlson, International Search in Report in International Application No. PCT/US2005/016405, Sep. 25, 2007, 6 pages.

Authorized Officer J. W. Wee, international Search Report and Written Opinion in International Application No. PCT/US2007/079088, Feb. 12, 2008 (6 pages).

Authorized Officer L. Young, International Search Report and the Written Opinion in International Application No. PCT/US06/47944, Apr. 24, 2008, 8 pages.

Authorized Officer L. Young, International Search Report and Written Opinion in International Application No. PCT/US06/18405, Aug. 29, 2007, 8 pages.

Authorized Officer L. Young, International Search Report and Written Opinion in International Application No. PCT/US06/19096, Apr. 30, 2007, 7 pages.

Authorized Officer L. Young, International Search Report and Written Opinion in International Application No. PCT/US06/28483, Jul. 18, 2007, 7 pages.

Authorized Officer S. Huynh, International Search Report and Written Opinion in International Application No. PCT/US06/09350, Jan. 11, 2007, 7 pages.

Authorized Officer S. Kim. International Search Report and Written Opinion, PCT/US2007/075628, Jan. 10, 2008 (10 pages).

Examiner's Report No. 1 on Patent Application 2002306523, Apr. 26, 2007, Australian Government, IP Australia.

Instituto Mexican de la Propiedad Industrial, (7 pages) Mar. 10, 2008.

"Be on Eon!," Eonstreams, Inc., 2004, 1 page, [online] [Retrieved on Apr. 7, 2005] Retrieved from the Internet <URL:http://www.eonstreams.com/>.

"By Using Multicast, Wireless Communication, New Information Can Be Distributed," Nikkei Internet Technology, Sep. 22, 1997, pp. 106-111, vol. 3.

ENCO: World Class Digital Audio Delivery Systems, [online], Retrieved from the Internet: <URL: http://www.enco.com/index.htm>.

"Eonstreams, Advertise with us!," Eonstreams, Inc., 2006, 1 page, [online] [retrieved on Apr. 28, 2006] Retrieved from the Internet: <URL: http://www.eonstreams.corn/Advertisers.htm>.

"Eonstreams, advertising . . . ," Eonstreams, Inc., 2004, 1 page, [online] [retrieved on Apr. 7, 2005] Retrieved from the Internet: <URL:http://www.eonstreams.com/ServicesAdv.htm>.

"Eonstreams, Better together . . . ," Eonstreams, Inc., 2006, 1 page, [online] [retrieved on May 5, 2006] Retrieved from the Internet: URL:http://www.eonstreams.com/.

"Eonstreams, case studies . . . ," Eonstreams, Inc., 2004, 2 pages, [online] [retrieved on Apr. 7, 2005] Retrieved from the Internet: <URL:http://www.eonstreams.com/SamplesCase.htm>.

"Eonstreams, clients love us . . . ," Eonstreams, Inc., 2004, 1 page, [online] [retrieved on Apr. 7, 2005] Retrieved from the Internet: <URL:http:/www.eonstreams.com/Testimonials.htm>.

"Eonstreams, FAQs," Eonstreams, Inc., Mar. 3, 2006, 7 pages, [online] [retrieved on Apr. 28, 2006] Retrieved from the Internet: <URL: http://www.eonstreams.com/HowToFaqs.htm>.

"Eonstreams, Inc. Secures Financing to Deploy Revolutionary Ad Insertion Capability," Source Eonstreams, Inc., Mar. 29, 2005, 2 pages, [online] [retrieved on Apr. 8, 2005] Retrieved from the Internet: <URL: http://www.prnewswire.com/cgi-bin/stories.pl?ACCT=104&STORY=/www/story/03-29-2005/0003288 . . . >.

"Eonstreams, Kevin Woods, CTO," Eonstreams, Inc., 2004, 1 page, [online] [retrieved on Apr. 7, 2005] Retrieved from the Internet: <URL: http://www.eonstreams.com/CoInfoCTO.htm>.

"Eonstreams, pay-per-view . . . ," Eonstreams, Inc., 2004, 1 page, [online] [retrieved on Apr. 7, 2005] Retrieved from the Internet: <URL: http://www.eonstreams.com/ServicesPPV.htm>.

"Eonstreams, Press releases . . . ," Eonstreams, Inc., Feb. 2, 2006, 6 pages, [online] [retrieved on Apr. 28, 2006] Retrieved from the Internet: <URL: http://www.eonstreams.com/PressReleases.htm>.

"Eonstreams, Steve Newman, CEO," Eonstreams, Inc., 2004, 1 page, [online] [retrieved on Apr. 7, 2005] Retrieved from the Internet: <URL: http://www.eonstreams.com/CoInfoCEO.htm>.

"Eonstreams, streaming . . . ," Eonstreams, Inc., 2004, 1 page, [online] [retrieved on Apr. 7, 2005] Retrieved from the Internet: <URL: http://www.eonstreams.com/ServiceStreaming.htm>.

"Eonstreams, Streaming . . . ," Eonstreams, Inc., 2006, 1 page, [online] [retrieved on Apr. 28, 2006] Retrieved from the Internet: <URL: http://www.eonstreams.com/Streaming.htm>.

"Eonstreams, subscription . . . ," Eonstreams, Inc., 2004, 1 page, [online] [retrieved Apr. 7, 2005] Retrieved from the Internet: <URL: http://www.eonstreams.com/ServicesSub.htm>.

"Eonstreams, Susan Seagraves, CFO," Eonstreams, Inc., 2004, 1 page, [online] [retrieved on Apr. 7, 2005] Retrieved from the Internet: <URL: http://www.eonstreams.com/CoInfoCFO.htm>.

"Eonstreams, testimonials, 650WSM Nashville's Country Legend!, WSM | Citadel Broadcasting Corporation," Eonstreams, Inc., 2004, 1 page, [online] [retrieved on Apr. 7, 2005] Retrieved from the Internet: <URL: http://www.eonstreams.com/TestimonialsWSM.htm>.

"Eonstreams, testimonials, Citadel Communications Corporation, WSM | Citadel Broadcasting Corporation," Eonstreams, Inc., 2004, 2 pages, [online] [retrieved on Apr. 7, 2005] Retrieved from the Internet: <URL: http://www.eonstreams.com/TestimonialsCitadel.htm>.

"Eonstreams, Tools . . . ," Eonstreams, Inc., 2006, 1 page, [online] [retrieved on Apr. 28, 2006] Retrieved from the Internet: <URL: http://www.eonstreams.com/How_To_Tools.htm>.

"Eonstreams, total solutions . . . ," Eonstreams, Inc., 2004, 1 page, [online] [retrieved on Apr. 7, 2005] Retrieved from the Internet: <URL: http://www.eonstreams.com/Services.htm>.

"Eonstreams, what we do . . . ," Eonstreams, Inc., 2004, 1 page, [online] [retrieved on Apr. 7, 2005] Retrieved from the Internet: URL: http://www.eonstreams.com/Samples.htm>.

"Eonstreams, Who we are . . . ," Eonstreams, Inc., 2006, 1 page, [online] [retrieved on Apr. 28, 2006] Retrieved from the Internet: <URL: http://www.eonstreams.com/About_Us.htm>.

"Eonstreams, WIVK Knoxville, TN . . . ," Eonstreams, Inc., 2004, 1 page, [online] [retrieved on Apr. 7, 2005] Retrieved from the Internet: <URL: http://www.eonstreams.com/SamplesDemosWIVK.htm>.

"Eonstreams, Z100, NY . . . ," Eonstreams, Inc., 2004, 1 page, [online] [retrieved on Apr. 7, 2005] Retrieved from the Internet: <URL: http://www.eonstreams.com/SamplesDemosZ100.htm>.

"MediaSpan Online Services Partners With Eonstreams," EContentMag.com, Feb. 3, 2006, 3 pages, [online] [retrieved on Apr. 28, 2006] Retrieved from the Internet: <URL:http://www.econtentmag.com/Articles/ArticleReader.aspx?ArticleID=15031>.

"NAB2005—The World's Largest Electronic Media Show," National Association of Broadcasters, 2005, 2 pages, [online] [retrieved on Apr. 28, 2006] Retrieved from the Internet: <URL:http://www.nabshow.com/exhibitors/NAB2005/company.asp?id=11150>.

"Streaming Audio and Video Development and Media Hosting Solutions," VitalStream, Inc., 2000-2006, 1 page, [online] [retrieved on May 22, 2006] Retrieved from the Internet: <URL:http://www.vitalstream.com/about/index.html.>.

"VitalStream Acquires Eonstreams to Provide Comprehensive Online Advertising Solutions," VitalStream, Press Release, May 22, 2006, 3 pages, [online] [retrieved on May 22, 2006] Retrieved from the Internet: <URL: www.vitalstream.com/news/release-05-22-06.html>.

* cited by examiner

320

Prototype Preemptible Category/Keyword Setup User Interface

RevenueSuite: Preemptible Inventory Setup

Define the preemption rules for the station below. All entries should be normalized for :60 second units; :30 second units will be calculated at 80%. Effective CPM will be calculated for Spot Rate entries using most recent book, greater of DMA or Metro AQH. All rules are processed in ascending order.

Station [DMRC-FM] — 324

Pre-emptible ⊙ Category [Pre1]  ○ Title Keyword [ ] — 322
            — 323

Preemption Rules                    Minimums as:  ⊙ CPM  ○ Spot Rate

| | Morning Drive (M-F, 6a-10a) | | |
|---|---|---|---|
| Rule # | Maximum # of Spots | Minimum CPM [Spot Rate] | Add / Remove Rules |
| 1 | 10 | $ 5.00 | + |

| | Midday (M-F, 10a-4p) | | |
|---|---|---|---|
| Rule # | Maximum # of Spots | Minimum CPM [Spot Rate] | Add / Remove Rules |
| 1 | 15 | $ 3.00 | − |
| 2 | 5 | $ 2.00 | − |
| 3 | 1 | $ 1.00 | + − |

| | 328  Afternoon Drive (M-F, 4p-7p) | | |
|---|---|---|---|
| Rule # | Maximum # of Spots | Minimum CPM [Spot Rate] | Add / Remove Rules |
| 1 | 10  _330_ | $ 5.00  _332_ | −  _334_ |
| 2 | 5 | $ 3.50 | + − |

| | Evening (M-F, 7p-12a) | | |
|---|---|---|---|
| Rule # | Maximum # of Spots | Minimum CPM [Spot Rate] | Add / Remove Rules |
| 1 | 10 | $ 3.00 | + |

| | Weekend (Sat-Sun, 6a-12a) | | |
|---|---|---|---|
| Rule # | Maximum # of Spots | Minimum CPM [Spot Rate] | Add / Remove Rules |
| 1 | 10 | $ 3.00 | + |

326

[Save] 336    [Cancel] 338

© 2006 Google

FIG. 3C

Prototype Avails Filter User Interface 500

RevenueSuite: Preemptible Inventory Setup

Define the preemption rules for the station below. All entries should be normalized for :60 second units; :30 second units will be calculated at 80%. Effective CPM will be calculated for Spot Rate entries using most recent book, greater of DMA or Metro AQH. All rules are processed in ascending order.

Station: DMRC-FM

Pre-emptible   ● Category [Pre1]   ○ Title Keyword [ ]

Preemption Rules         Minimums as: ● CPM  ○ Spot Rate      502      504

| Morning Drive (M-F, 6a-10a) | | | | Avails Filter | |
|---|---|---|---|---|---|
| Rule # | Maximum # of Spots | Minimum CPM [Spot Rate] | Add / Remove Rules | Spot Cap / Hr | CPM Cap |
| 1 | 10 | $ 5.00 | + | 5 | $ 5.00 |

| Midday (M-F, 10a-4p) | | | | Avails Filter | |
|---|---|---|---|---|---|
| Rule # | Maximum # of Spots | Minimum CPM [Spot Rate] | Add / Remove Rules | Spot Cap / Hr | CPM Cap |
| 1 | 15 | $ 3.00 | − | 5 | $ 4.00 |
| 2 | 5 | $ 2.00 | − | 5 | $ 4.00 |
| 3 | 1 | $ 1.00 | + − | 5 | $ 4.00 |

| Afternoon Drive (M-F, 4p-7p) | | | | Avails Filter | |
|---|---|---|---|---|---|
| Rule # | Maximum # of Spots | Minimum CPM [Spot Rate] | Add / Remove Rules | Spot Cap / Hr | CPM Cap |
| 1 | 10 | $ 5.00 | − | 5 | $ 5.00 |
| 2 | 5 | $ 3.50 | + − | 5 | $ 5.00 |

| Evening (M-F, 7p-12a) | | | | Avails Filter | |
|---|---|---|---|---|---|
| Rule # | Maximum # of Spots | Minimum CPM [Spot Rate] | Add / Remove Rules | Spot Cap / Hr | CPM Cap |
| 1 | 10 | $ 3.00 | + | 5 | $ 3.00 |

| Weekend (Sat-Sun, 6a-12a) | | | | Avails Filter | |
|---|---|---|---|---|---|
| Rule # | Maximum # of Spots | Minimum CPM [Spot Rate] | Add / Remove Rules | Spot Cap / Hr | CPM Cap |
| 1 | 10 | $ 3.00 | + | 5 | $ 3.00 |

[Save] [Cancel]            [Update Avails Filter] [Restore Default Limits]

© 2006 Google                          506            508

FIG. 5

| Initial Default Avails Filter Rules | | 600 |
|---|---|---|
| Daypart | Google Limit (Max Spots per Hour per Rule) | CPM Cap ($) |
| Morning Drive    602 | 5 | 5    604 |
| Midday | 5 | 4 |
| Afternoon Drive | 5 | 5 |
| Evening | 5 | 3 |
| Weekend | 5 | 3 |

FIG. 6

PREEMPTIBLE STATION INVENTORY

TECHNICAL FIELD

The following description relates to advertisement systems.

BACKGROUND

Advertisements can be included in various forms of media. For example, radio content broadcast over the airways can include advertisements that are presented to a listening audience. The advertisements can be targeted to the listening audience based on various parameters. In a radio broadcast, the content associated with the radio broadcast can be generally selected by the radio station, allowing for the selective playing over the airways of content that is generated locally or provided from other sources or locations. Similarly, the advertisements that are mixed with the content can be provided locally or provided from other sources.

SUMMARY

Methods, apparatus, systems, processes, engines and computer program products are provided for automatically preempting advertisements in, for example, a broadcast environment such as a radio broadcast.

In one aspect a method is provided that includes identifying one or more advertisements in a schedule that are available for preemption, identifying rules for preempting the identified advertisements, programmatically evaluating the identified rules including evaluating available inventory and substituting one or more advertisements from available inventory for the identified advertisements if the rules are satisfied.

Aspects of the invention can include none, one or more of the following features. The method can include prior to substituting, determining if one or more limits on preemption have been exceeded, and if so, maintaining one or more identified advertisements in the schedule. Identifying advertisements can include categorizing each advertisement in the schedule. Identifying advertisements can include tagging each advertisement in the schedule that is preemptible. Identifying advertisements can include determining for each advertisement in the schedule if the advertisement is marked as being preemptible.

Identifying rules can include specifying rules for preemption. Specifying rules can include specifying criteria for evaluating the identified advertisements as compared to the available inventory. The rules can specify criteria for evaluating available inventory. Evaluating can include evaluating pricing data associated with the available inventory. Substituting can include substituting advertisements from the available inventory for the identified advertisements to realize greater revenue. Substituting can be limited based on further criteria. Substituting can be limited based on time of day associated with an identified advertisement. Substituting can be limited based on a time since an advertisement from the available inventory that is proposed for substitution was last included in the schedule.

Identifying advertisements in a schedule can include evaluating all advertisements in the schedule to determine one or more that are preemptible. Programmatically evaluating the identified rules can include evaluating a first rule as against available inventory, the first rule being associated with a first time period and evaluating a second rule as against available inventory, the second rule being associated with a second different time period. Substituting for an identified advertisement that is associated with the first time period can be in accordance with the first rule and substituting for an identified advertisement that is associated with the second time period can be in accordance with the second rule. The advertisements can be audio advertisements for distribution on a radio broadcast medium or multimedia advertisements for distribution on a television broadcast medium.

In another aspect, a system is provided that includes a hub, a broadcast station; and a preemption module including components distributed between the hub and the broadcast station, the preemption module operable to programmatically identify one or more advertisements in a schedule that are available for preemption, identifying rules for preempting the identified advertisements; programmatically evaluate the identified rules including evaluating available inventory and substituting one or more advertisements from available inventory for the identified advertisements if the rules are satisfied.

Aspects of the invention can include none, one or more of the following features. The broadcast station can be operable to tag advertisements in the schedule that can be preempted. The hub can include a filter operable to limit a number of preemptions that occur to the schedule. The broadcast station can include components of the preemption module that are configured to programmatically evaluate identified rules and substitute advertisements. The hub can include components of the preemption module that identify rules and identify advertisements for substitution. The hub can be a broadcasting hub and where the broadcast station can be a regional broadcast studio of a radio communication system. The hub can be a broadcasting hub and where the broadcast station is a regional broadcast studio of a television communication system.

In another aspect an apparatus is provided that includes means for identifying one or more advertisements in a schedule that are available for preemption, means for identifying rules for preempting the identified advertisements, programmatic means for evaluating the identified rules including evaluating available inventory and means for substituting one or more advertisements from available inventory for the identified advertisements if the rules are satisfied.

In another aspect a method is provided for determining one or more advertisements in a schedule that are available for preemption, providing rules for preempting advertisements and automatically preempting the one or more advertisements using an advertisement from available inventory if the rules are satisfied.

DESCRIPTION OF DRAWINGS

FIG. 3C is an exemplary user interface used to configure preemption rules for audio advertisements.

FIG. 5 is an exemplary user interface showing a configuration of filtering rules for audio advertisements.

FIG. 6 is an exemplary user interface showing filtering rules that are used in conjunction with preemption rules shown in FIG. 5.

Like reference symbols in the various drawings indicate like elements.

DETAILED DESCRIPTION

Figure 1:
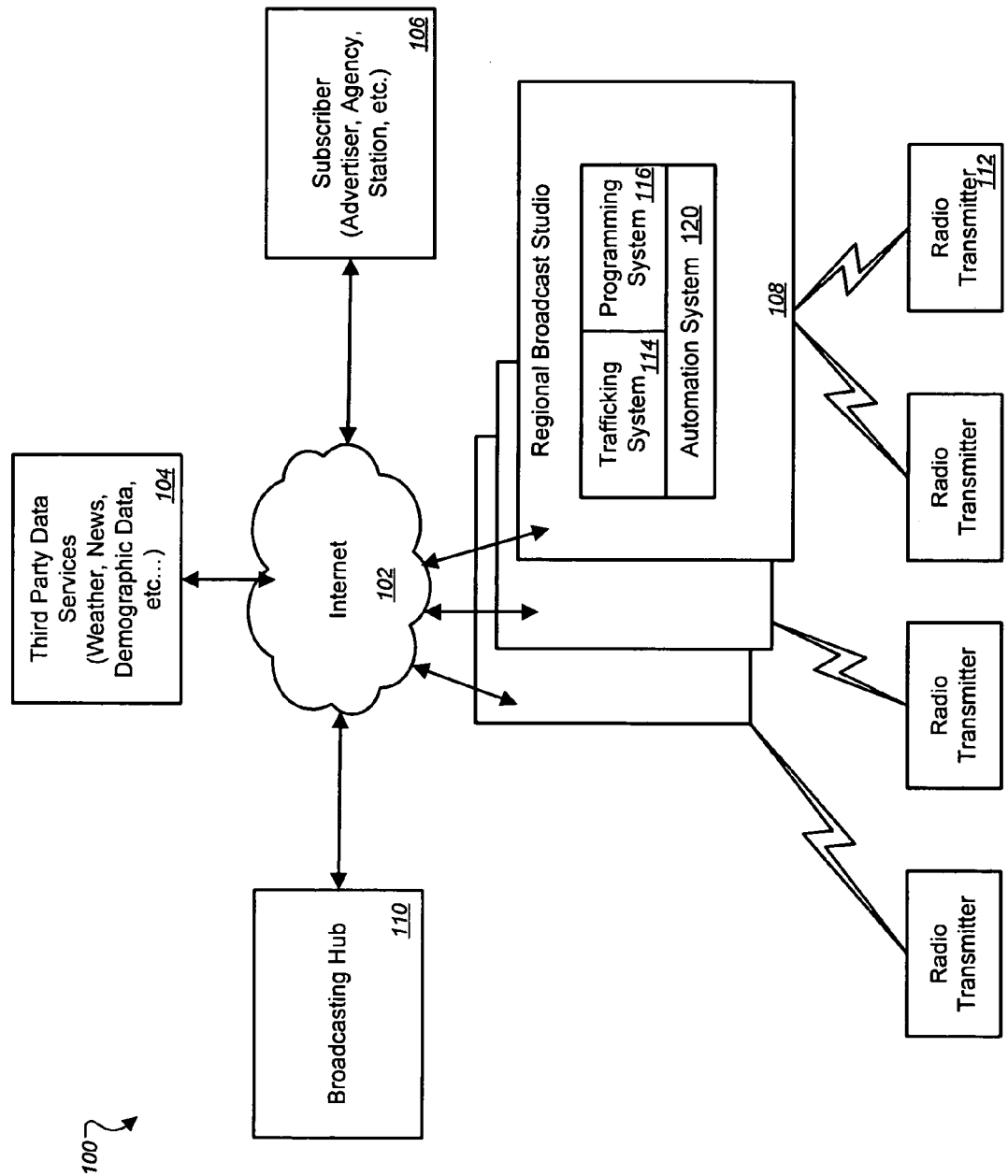
FIG. 1 illustrates an architecture of a communication system used to broadcast audio advertisements.

FIG. 1 illustrates an example architecture of a communication system 100 used to broadcast audio advertisements. By way of example, audio advertisement systems and methods are discussed below. The methods, processes, engines, apparatus, computer program products, systems and the like discussed below are equally applicable to other communication environments including broadcast television (TV), cable television, satellite TV, Internet communication systems (including Internet radio and Internet TV), and other communication environments. Audio advertisements may be inventoried and categorized for the communication system 100 in several ways (e.g., keyword, price, vendor, last played, etc.). Several radio stations can use the communication system 100 and may wish to have access to inventoried advertisement information to schedule advertisement play on their station. In some implementations, the radio stations, the broadcasting hub or combination of the two may use the advertisement inventory information and other data to un-schedule current advertisements, and reschedule new advertisements that may be more suitable (e.g., suitable in terms of content, price, or other criteria) in a particular time slot. For example, a radio station may receive (e.g., sell) a last minute advertisement at a higher price (e.g., cost per thousand (CPM)) than other previously received advertisements, and can "bump" a currently scheduled advertisement in favor of the higher priced advertisement. The un-scheduling of previously scheduled advertisements is referred to herein as preemption, and is controlled by one or more preemption rules.

In some implementations, the communication system 100 may receive instructions (e.g., preemption rules) from a radio station (e.g., software instructions) detailing how to broadcast audio advertisements during a particular time. For example, the radio station may define rules to broadcast a higher priced audio advertisement during a high volume traffic time, such as during a rush hour commute. Defining rules and categorizing audio advertisements may allow radio stations to quickly and efficiently identify advertisement inventory for scheduling radio play on their station.

As shown in FIG. 1, the communication system 100 includes a network 102 to communicatively couple third-party data sources 104, at least one subscriber 106, at least one regional broadcast studio 108 (e.g. radio station), and a broadcasting hub 110. In a radio broadcast implementation, at least one regional studio 108 may be further communicatively coupled to at least one radio transmitter 112. In this example, the network 102 is the Internet. In other implementations, the network 102 can be any network, such as a LAN, a MAN, a WAN, a wired or wireless network, a private network, or a virtual private network.

The network 102 is shown communicatively coupled to third-party data sources 104. Third-party data sources 104 can be any database, data mart, or other data source that provides data of interest to the subscriber 106, the hub 110, or the studios 108 relevant to the scheduling of advertisements. For example, third-party data may be Arbitron ratings and demographic breakdowns for each station in a broadcast network, such data may be of use to a subscriber 106 in deciding what amount that he would be willing to pay to run an advertisement campaign on a given station. In addition, third-party data may be the weather forecast, current weather conditions, or news events such as stock prices, sports scores, data from a syndicated data feed such as an RSS feed, or any other data relevant to a party's desire to play an advertisement. In one implementation, information or data is received or collected directly by the broadcasting hub 110 rather than from third-party sources. Regardless of the source, the broadcasting hub 110 uses the information in evaluating whether criteria are met for the play of an advertisement.

The subscriber 106 is also communicatively coupled to the broadcasting hub 110. This allows the subscriber 106 to purchase, schedule, and upload an advertising spot using a user interface of the broadcasting hub 110. Subscriber 106 may access hub 110 via a connection to the network 102. The connection to the network 102 may be any conventional connection that allows access to hub 110. For example, subscriber 106 may access hub 110 using TCP/IP and a conventional dial-up connection over a modem, or a dedicated connection that provides constant access. The broadcasting hub 110 may have a unique HyperText Transfer Protocol (HTTP) address, a unique FTP address, or any other addressing scheme that allows subscriber 106 to identify hub 110. Subscribers 106 can include advertisers, agencies, stations, or any other entity that interacts with the broadcasting hub 110. In some implementations, subscribers 106 have an account with the broadcasting hub 110 and are charged a fee for use of the broadcasting hub 110. In other implementations, subscribers 106 can access the broadcasting hub 110 free of charge.

As shown in FIG. 1, a regional broadcast studio 108 can include a trafficking system 114. The trafficking system 114 may schedule radio advertisements based on an advertiser request. For example, the trafficking system 114 may receive a request to schedule the play of a particular advertisement in three slots at three assigned times each day during the weekdays of Monday through Friday.

The regional broadcast studio 108 can also include a programming system 116 that describes the overall content broadcast on a radio station. The programming system 116 can be monitored automatically by a network, such as network 102 and may be communicatively coupled to the trafficking system 114.

Finally, the regional broadcast studio 108 can include an automation system 120. The automation system 120 can allow for the preemption of previously scheduled advertisements as will discussed in greater detail below. In one implementation, the automation system 120 can include distributed portions and include a local portion that is included in a regional broadcast studio 108 and a remote portion that is included the broadcasting hub 110.

The regional broadcast studio 108 is communicatively coupled to the broadcasting hub 110, such that the broadcasting hub 110 is capable of forwarding an audio advertisement to the regional broadcast studio 108 for play. Thus, the subscriber 106 is capable of submitting to the broadcasting hub 110, an advertisement for play along with specific criteria for the play of that advertisement, and the broadcasting hub 110 will forward the advertisement to a regional broadcasting studio 108 for play as appropriate.

Figure 2:
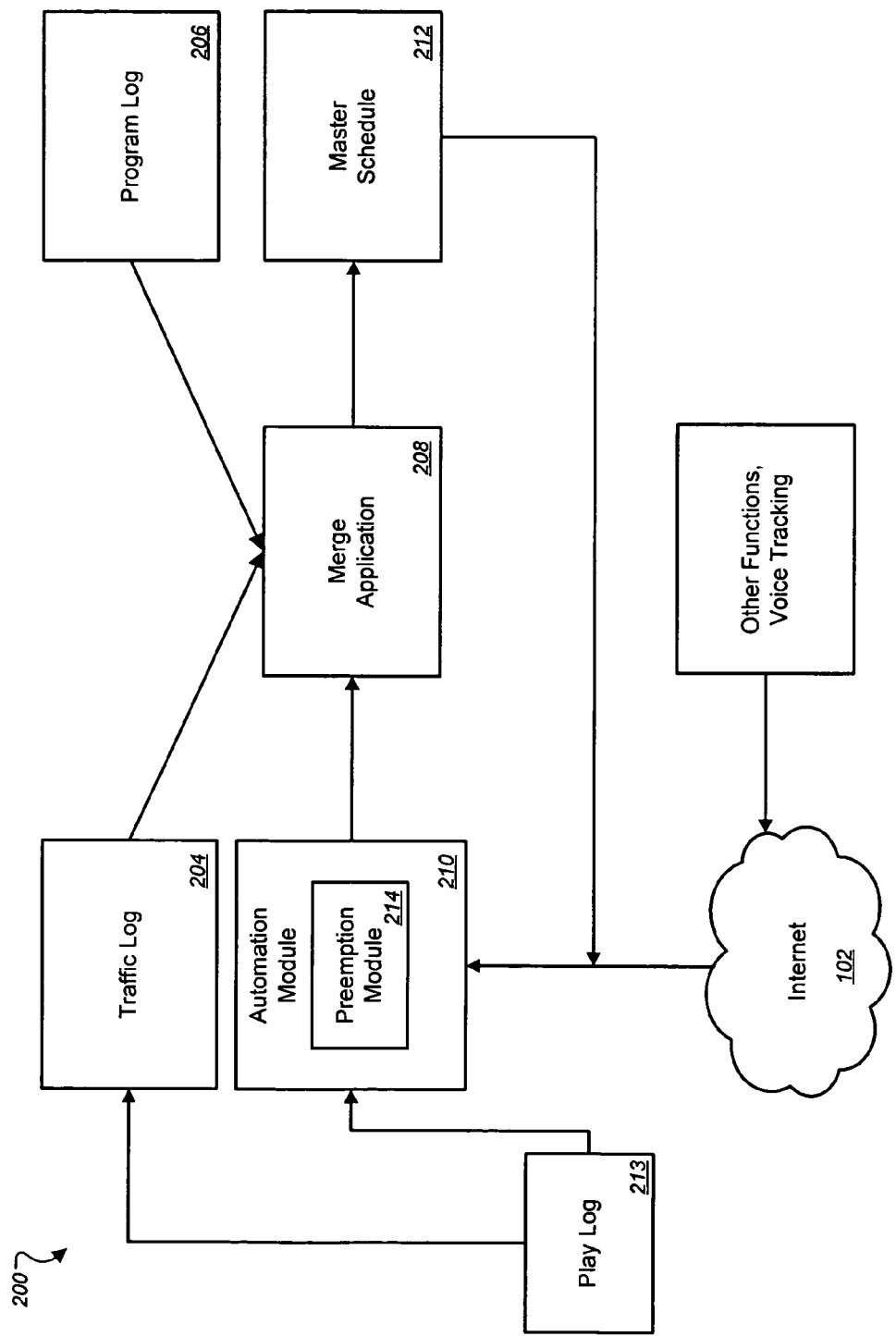
FIG. 2 is an exemplary illustration of a radio play environment.

FIG. 2 is an exemplary illustration of a radio play environment 200. Subscribers may submit advertisements for play in the radio play environment 200. The environment 200 includes a traffic log 204 associated with the trafficking system 114, as discussed above, a program log 206, a merge application 208, an automation module 210, a master schedule 212, a play log 213, and may include remote applications, including external inputs 216 such as voice tracking, satellite, and FTP, for example. The traffic log 204, the program log 206, and the master schedule 212 as illustrated preferably include identifications of the plays that are to occur in accordance with each.

The traffic log 204 may be handled by the trafficking system 114 as discussed hereinabove. The traffic log can include pointers to advertisements that are to be integrated with the program content to produce the stream of information that is broadcast. The program log 206 may include programs, such as songs or other content that are to be played over the air. Generally, the merge application 208 merges the traffic log 204 and the program log 206 and manages the filling of any holes, such as by the automation module 210, to create the master schedule 212. The master schedule 212 is directed to the automation module 210, which then monitors the inputs and outputs to and from the radio station for play over airwaves. The play log 213 is generated based on the output of the automation as that output is generated over the airwaves. The output of the play log 213 may be monitored before billing to advertisers to ensure that advertisements have properly been played by the automation module 210.

The automation module 210 may control the final output over the airwaves of a radio play. For example, the automation module 210 may switch from a satellite channel to a local channel, or to an internet channel, and back again to obtain play from various locations for incorporation into the automation module play. In some implementations, the automation module 210 may determine when to play a particular advertisement based on predetermined rules. For example, a radio station may set up predetermined preemption rules as described above depicting one or more pricing schedules for their preemptible advertisements, and determine to play advertisements having specific price points throughout the day.

In order to allow for preemption rules, a preemption module 214 may be placed at any of a plurality of points within the radio play system discussed hereinabove, or alternatively portions of the preemption module 214 can be distributed in the system. In one specific example, portions of the preemption module 214 are in the regional broadcast studio 108 and other portions are included in the broadcasting hub 110. For example, the preemption module 214 may be placed and a associated with the traffic log 204, the master schedule 212, the merge application 208, or the automation module 210. As discussed above the preemption module 214 can be used to replace, for example, underpaid advertising spots with more lucrative advertising spots. Consequently, although the preemption module 214 may be associated with the traffic log 204 or master schedule 212, advertising payment rate data may not (and typically is not) available at either location. In the implementation shown, the preemption module 214 is located within or in association with the automation module 210, in order to allow the automation module 210 to follow the predetermined set of rules on the replacement and reevaluation of a merged traffic log.

Figure 3A:
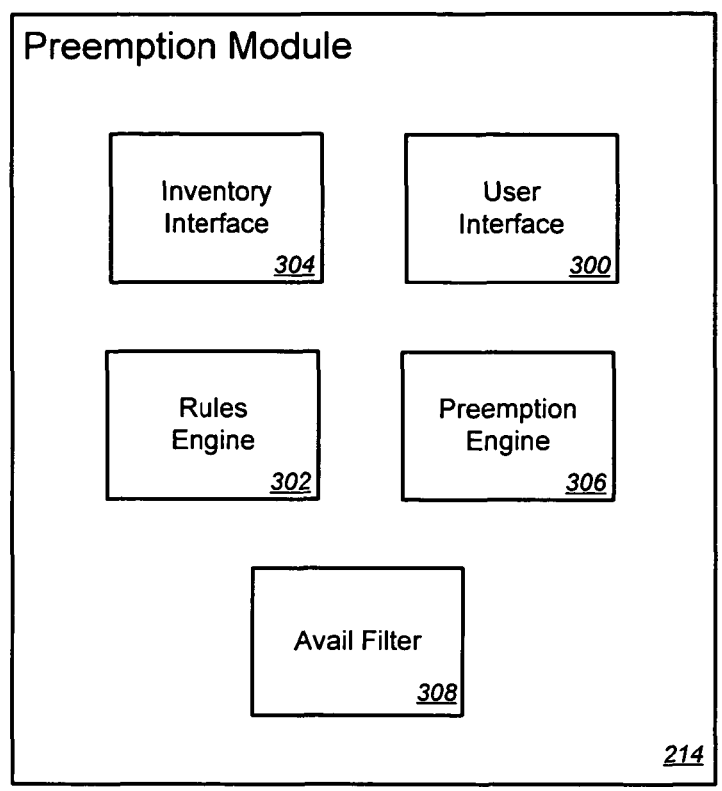
FIG. 3A is a block diagram of a preemption module.
Figure 3B:
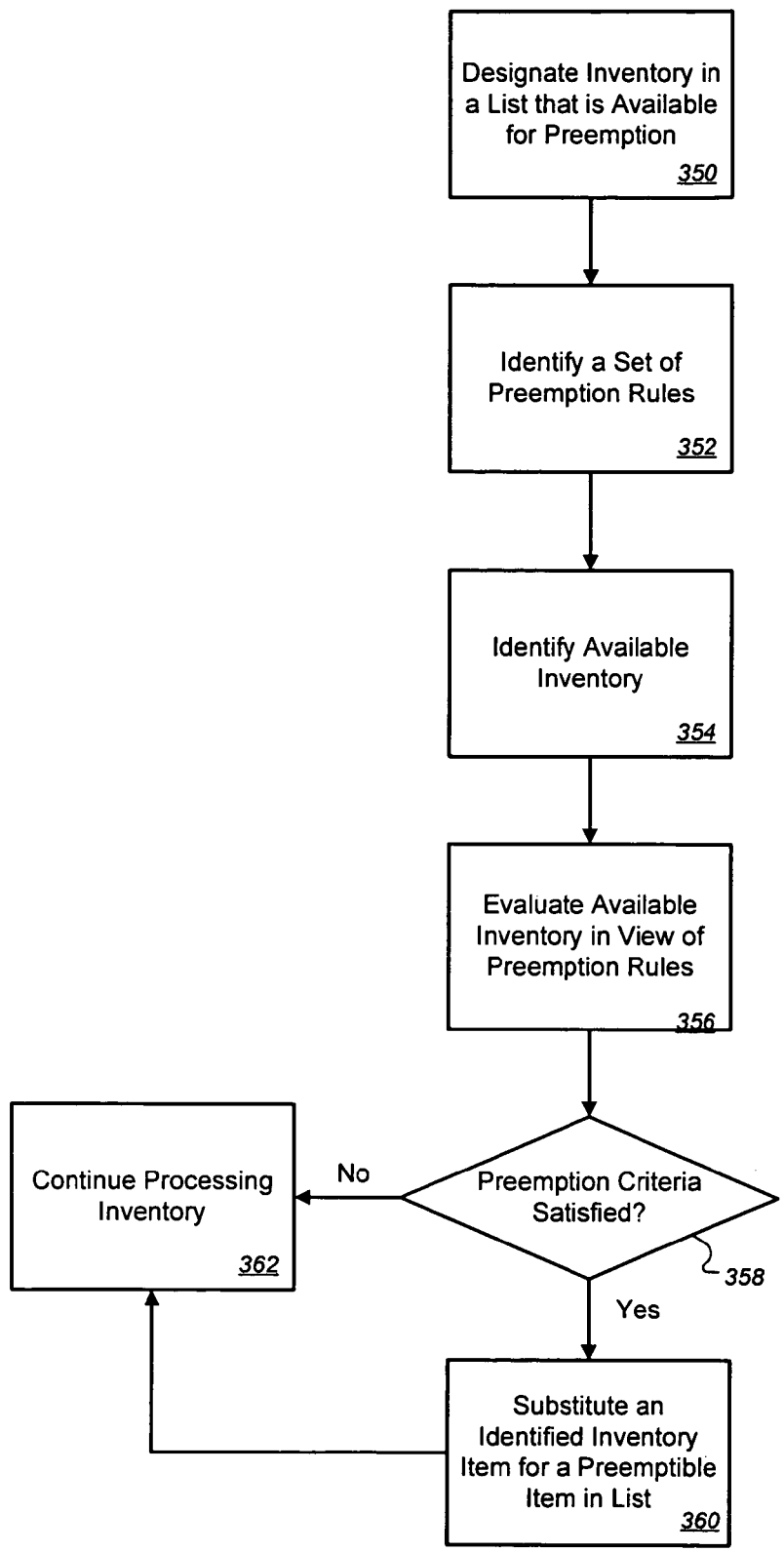
FIG. 3B is a flow diagram for a method of preempting inventory.

Referring now to FIG. 3A, in one implementation the preemption module 214 includes a user interface 300, a rules engine 302, an inventory interface 304, and a preemption engine 306. Examples of the interfaces presented are shown and discussed in relation to FIGS. 3C, 4, 5 and 6 below. Rules engine 302 is used to set and maintain rules that are evaluated by the preemption engine 306. An interface associated with the rules engine 302 is shown in association with FIG. 3C. Inventory interface 304 provides an interface to available inventory that may be evaluated using the rules. Processing engine 306 evaluates the rules, the available inventory and makes preemption decisions. As used herein, available inventory refers to the set of inventory that is available for making preemption selections from, that is, inventory that can be selected to be used in the place of an advertisement that is designated as preemptible. In one implementation, associated with processing engine 306 is an availability filter 308. The availability filter 308 can be used to limit the number, occurrence, frequency or otherwise of preemption selections that are made based on various criteria. The availability filter 308 is discussed in greater detail below. Other elements may be included within preemption module 214 including for example other interfaces. In one implementation a data interface is provided to allow the preemption module to retrieve information associated with preemptible inventory that is used by the rules engine during evaluation (e.g., pricing data associated with the preemptible inventory). As discussed above, in some implementations, individual components or functions associated with preemption module 214 can be distributed. In one particular implementation, the user interface 300, rules engine 302 and availability filter 308 are grouped together at the broadcast hub 110. In this configuration, the inventory interface 304 and the preemption engine 306 are included in the regional broadcast studio 108. Referring now to FIG. 3B, a preemption method is shown that can be implemented by, for example, the preemption module 214. The method begins with the designation of inventory in a list that can be preempted (e.g., designating preemptible inventory items) (step 350).

The designation of preemptible inventory items can be specific or inferred. In one implementation, the designation is specific. Specific designation can be executed by one or more systems associated with the list producer (e.g., a radio station where the list is a traffic list or program list). In one implementation, the specific designation is of the form of a tag. In one implementation, the tag can define a category (e.g., preemptible content category) or include a keyword. Applying the category or keyword to advertisement inventory essentially "tags" each advertisement for use during scheduling. Assigning a keyword to advertisement inventory provides radio stations with an order level flexibility (e.g., the keyword can be changed at each instance of a preemptible traffic order).

In one implementation, the designation can be of the form of a tag that is included in an identifier associated with an inventory item. The tag can be, for example, included in the title of the inventory element. Alternatively, the tag can be of the form of a category indicator: each preemptible inventory item in the list can be classified by an origination system (e.g., the radio station) as being of a same category. In another implementation, all inventory that is associated with the list can be preemptible and no specific designation is required.

The list including designated preemptible inventory is received at a processing location and a set of preemption rules are identified (step 352). The set of preemption rules can be associated with an individual station. For example, the preemption module 214 can include a rules engine 302 that allows a station to specify rules by category, by keyword, and/or by daypart. The rules can specify the criteria for preemption. Preemption criteria can include price, content, statistical information or other data used to evaluate a preemptible inventory item as against currently available inventory. In one implementation, the rules include pricing information that can be evaluated as against the available inventory by, for example, processing engine 306. The pricing data can be associated with the list of current inventory directly or indirectly. That is, the pricing data may or may not be part of the list.

Next available inventory is identified, by for example processing engine 306 using inventory interface 304 (step 354).

The available inventory includes data, such as pricing data. The available inventory is evaluated programmatically (e.g., automatically by the preemption module) in view of the rules (step 356). The evaluation can be by the processing engine 306 and include evaluating minimum pricing data associated with a station designated rule, time constraints associated with the timing that is designated for the play of the preemptible inventory, restrictions on preemption and the like. If preemption criteria are satisfied (step 358), an identified available inventory item is substituted for the preemptible inventory item in the list (step 360). In one implementation, the substitution can be performed by the processing engine 306. If not, the process continues until all inventory in the list has been processed (step 362).

FIG. 3C is an exemplary user interface 320 used to configure preemption rules for audio advertisements. The user interface 320 can be presented in a broadcast management console presented to a regional broadcast studio 108 by for example the hub 110 of FIG. 1. Preemption rules may be implemented by a radio station to stop a currently scheduled advertisement (i.e., a preemptible inventory item) from broadcasting in favor of a more suitable advertisement (e.g., a hire priced advertisement). In general, for a given radio station, a percentage of locally trafficked advertising campaigns are considered preemptible by the station.

In one implementation, the differentiation between a preemptible and a non-preemptible advertisement occurs during the scheduling of traffic orders. For example, each time a slot is scheduled, the radio station can modify the preemptibility of each advertisement based on a category or keyword related to the advertisement as discussed above. Rules defining how to handle preemptible inventory designated by category or keyword assignment can be defined using the user interface 320. As shown in FIG. 3C, a user may select a "Title Keyword" selection 322 to define a rule associated with inventory tagged by a specific keyword. Keyword tagging may include ongoing setup within a traffic system as the "Title Keyword" is requested in each preemptible traffic order.

Alternatively, a rule can be defined based on a category selection associated with advertisement inventory. A category rule definition provides radio stations with a near-seamless process without new repetitive tasks. The user may select a "Category" selection 323 to define a rule that is to be associated with particular inventory that includes the category tag. Category tagging may be a one time setup in a digital automation system, such as automation module 210, for example, and include the definition of the category and locating/placing all preemptible audio files in the category.

The user interface 320 includes a radio station drop down box 324 to select a user's particular radio station and one or more sets (e.g., time dependent) of preemption rules 326. In one implementation, the user may define different rule sets based on time of day (referred to herein as daypart rules). Each rule set can include one or more rules that can be evaluated for making preemption decisions. In the example shown, the user has selected to tag preemptible advertisement inventory using categories. As shown in FIG. 3, a preemption rule 328 (Afternoon Drive (M-F, 4 p-7 p)) includes a maximum number of spots dialog box 330, a minimum CPM, or spot rate dialog box 332, and functionality to add or remove rules for this particular time. Selecting a '+' symbol in an add/remove rules column 334 displays another line item for adding a new rule in the set. Alternatively, selecting a '−' symbol in the add/remove rules column 334 deletes a selected rule for a selected set.

In the implementation shown, the criterion used for making preemption decisions is pricing. As discussed above, other criteria can be used. The user interface 320 allows radio stations to specify any number of advertisement spots that may be preempted at a particular pricing (e.g., a specific cost per thousand (CPM) or spot rate). In particular, the preemptible advertisements can be allocated at prerequisite price points set by the station. Radio stations may also define multiple rules such that a specific quantity of advertisement spots may be preempted at one rate and other advertisement spots at another rate in a given set. In general, entries are normalized (in calculating pricing data) by the radio station in terms of sixty second units.

The maximum number of spots dialog box 330 determines the maximum number of spots that will be preempted using a given rule. The maximum can be set to realize increase in revenue (e.g., by playing advertisements with higher pricing levels) or other objectives.

The minimum CPM, or spot rate dialog box 332 defines the comparative pricing data that is to be used to decide whether preemption is to occur. If the pricing data associated with an advertisement that is available in inventory is greater than the minimum spot rate, then preemption will occur . . .

Upon completing the setup of preemption rules, the user may select a save button 336 to store all configured settings. Alternatively, the user may select a cancel button 338 to discard preemption rule changes made for the preemptible inventory.

Figure 4:
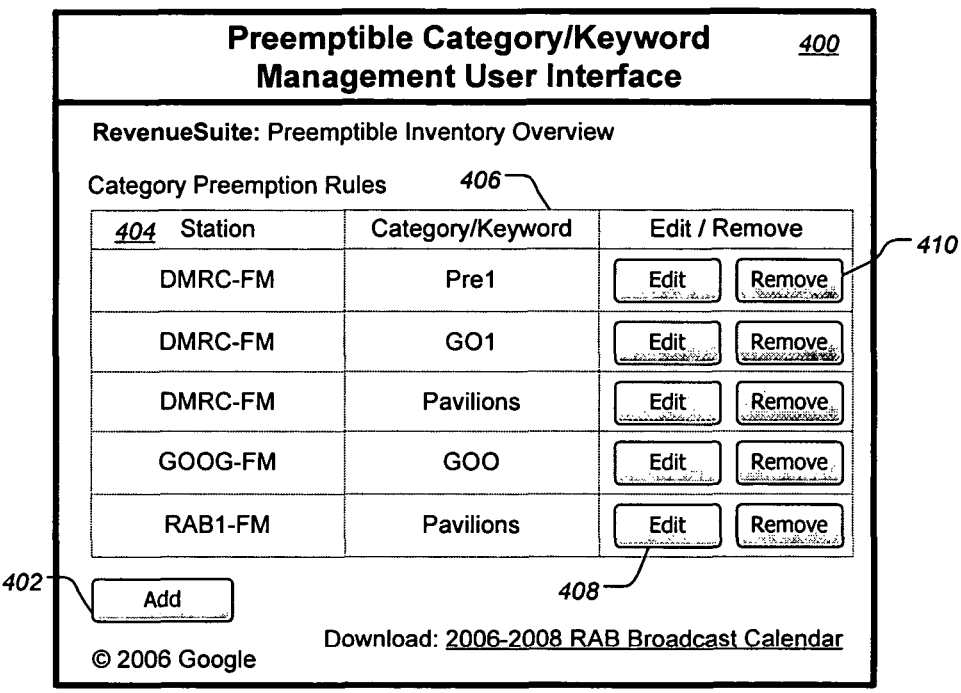
FIG. 4 is an exemplary user interface showing a preemptible category/keyword management console.

FIG. 4 is an exemplary user interface 400 showing a preemptible category/keyword management console. The user interface 400 may be accessible to define and modify rules for use in preemption based on, for example, categories or keywords that have been assigned to advertising inventory. The definition of the rule can be set using the preemptible setup user interface 320 (FIG. 3C). In some implementations, the user interface 400 may be accessed within a broadcast management console user interface, such as may be included within the automation module 210 (FIG. 2). Here, a user may add further stations having categories and keywords by using an add button 402. The user interface 400 includes category or keyword preemption rules that have been configured for each station. A station column 404 depicts the radio station having preemption rules. A category/keyword column 406 shows the name or the category or keyword defined for each station. Each preemption rule may show an edit button 408 to edit a predefined preemption rule and a remove button 410 to remove a predefined preemption rule.

In one implementation, a filter can be applied to the preemption rules. That is, in this implementation, the preemption of inventory may be limited by additional rules which are referred to herein as a filter. The filter can set the maximum number of preemptions that are allowed, irrespective of the maximum limits set in the preemption rules. In one implementation, the filter is imposed at the broadcast hub 110. In one implementation, the filter can be included as part of the preemption engine 306. In operation, an additional check is placed in the preemption process (as shown in FIG. 3B) where a check is made to determine if preemption would result in a violation of the maximums defined by the filter. If so, then no preemption occurs. FIG. 5 is an exemplary user interface 500 that can be used for configuration of filtering rules for audio advertisements. In some implementations, applying filtering rules can control the amount and type of advertisement inventory made available, thereby ensuring the advertisement system is not flooded with undesirable inventory. The filtering rules may be implemented using the "Avails Filter" user interface 500. User interface 500 is similar to the preemptible category/keyword management console 400 (FIG. 4), in that it includes the functionality to modify, add, or delete filtering rules.

In some implementations, the "Avails Filter" user interface is presented to internal users with access to an extended view of the radio station's preemptible category/keyword setup user interface 300 (FIG. 3). The "Avails Filter" user interface 500 includes a "spot cap per hour" dialog box 502 where an internal user (e.g., a broadcast hub user) can input an upper limit on an advertising spot for each time of day. The "Avails Filter" user interface 500 also includes a "CPM cap" dialog box 504 where a user can input an upper limit for an advertisement not to exceed a particular cost per thousand. Upon configuring filtering rules for one or more time slots, an update avails filter button 506 may be selected to update the current filter settings. Filtering rules can be globally configurable to set a default maximum number of spots that software, such as Google Audio Ads, will accept. In this example, the maximum number of spots per hour per rule is called the "Google Limit." In some implementations, a user may wish to restore a default limit, and may do so by selecting a restore default limits button 508.

FIG. 6 is an exemplary user interface 600 showing filtering rules. In particular, the user interface 600 shows the "Google Limit" and the "CPM Cap" as defined in the Avails filter shown in FIG. 5. For example, the "CPM Cap" for the Morning Drive is five 604.

Figure 7:
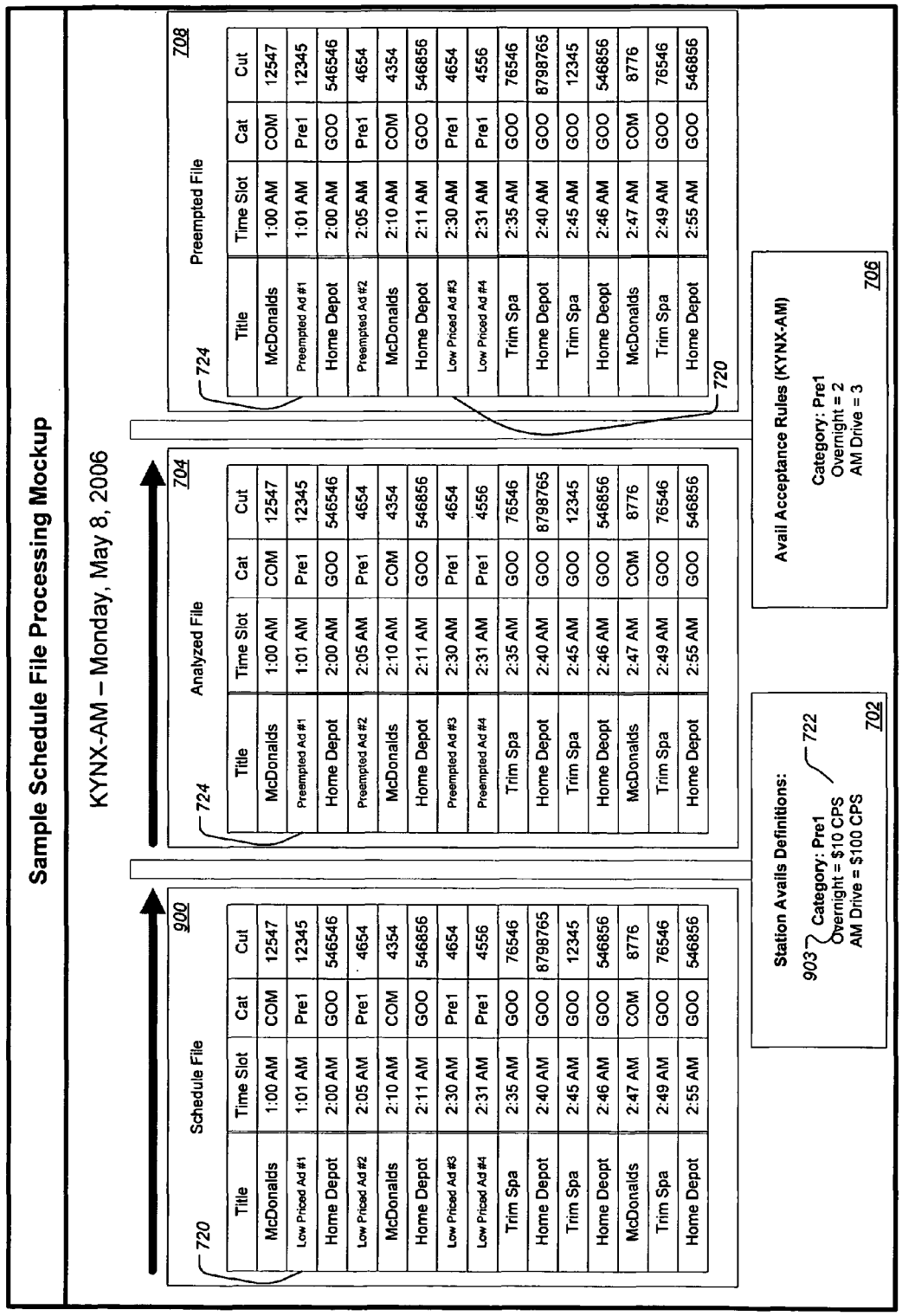
FIG. 7 a sample schedule depicting available advertisement inventory.

FIG. 7 is a sample schedule file 700 depicting available advertisement inventory. The schedule file 700 has category information (e.g., Cat) that defines rules that can be used for preemption. For example, category or keyword data is assigned to the advertisement inventory in the schedule file 700. As shown, one defined category for the schedule file is "Pre1" 703. Associated with a category can be a preemption rule. For example, the preemption rule associated with the category "Pre1" is shown in block 702. After the application of the preemption rules, a modified schedule file (referred to here as the analyzed file 704) can be created. Filter rules, for example filter rules associated with "Pre1" shown in block 706, can next be applied to modify the analyzed list to create a preempted list 708. Those of ordinary skill in the art will recognize that the application of the preemption rules and the filter can be performed in a single step and that no intermediary list is required.

In the example shown, the schedule file 700 includes four advertisements designated "low priced ads" 1 through 4 (722). Each of these advertisements has a category associated with it of Pre1. As discussed above, the category information can be used to retrieve rules for preemption of the advertisements. In this particular example, rules shown in definition 702 allow for the preemption of the low priced ads assuming that alternative advertising can be located that satisfies the rules. In the particular example, one pricing rule for overnight pricing 722 can be used to locate alternative advertisements.

Analyzed schedule 704 shows the preemption of the four low priced ads 722 with four new preempted ads 1 through 4 (724). The preempted ads 724 reflect advertisements that were able to be located that satisfied the pricing requirements set forth in the definition 702 for the associated category and the relevant time. Turning to preemption schedule 706, it can be seen that a filter has been applied to the analyzed schedule that is in accordance with a filter rule 706. Here the filter rule for the particular category of advertisement Pre1 and the relevant time indicates that only two preemptions can be made. Accordingly, the schedule file 908 reflects that two of the original low priced ads 720 are included in the preempted schedule along with two of the preempted ads 724. Which particular ads are replaced can be made based on various criteria. In the example shown, the first two slots that are available to be preempted are the ones that receive the alternative advertising content. Other selections can be made, including selections that alternate between preempted advertisements and originally scheduled advertisements.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    receiving, by a computing device, a predefined day-part schedule comprising a time period other than a day, including a plurality of advertisements scheduled for playing at a corresponding plurality of time slots, the plurality of advertisements including an advertisement that is available for preemption, wherein preemption includes replacing an advertisement that was previously scheduled for playing at a corresponding time slot with a different advertisement;
    receiving, by the computing device, rules for preempting advertisements, wherein the rules specify preemption criteria including a maximum number of the plurality of time slots available for preemption and a minimum price associated with a preempting advertisement;
    programmatically evaluating, by the computing device, an available inventory of preempting advertisements, each preempting advertisement included in the available inventory associated with a corresponding price, wherein each preempting advertisement is available to preempt an advertisement scheduled for playing at a corresponding time slot if the rules for preempting the advertisements are satisfied;
    determining:
        that a particular price associated with a particular preempting advertisement in the available inventory is greater than or equal to the minimum price specified in the rules for preempting, and
        that a quantity of the plurality of time slots included with the predefined day-part schedule that correspond to advertisements that have been preempted is less than the maximum number of the plurality of time slots available for preemption for the predefined day-part schedule;
    in response to the determining, preempting, by the computing device, the advertisement that is available for preemption with the particular preempting advertisement; and
    updating, by the computing device, the schedule to include the particular preempting advertisement.

2. The method of claim 1 further comprising, upon determining that the number of the plurality of time slots that correspond to advertisements that have been preempted is more than or equal to the maximum number of the plurality of time slots available for preemption, maintaining the advertisement that is available for preemption in the predefined day-part schedule.

3. The method of claim 1, wherein one or more of the plurality of advertisements in the predefined day-part schedule include a designation indicating that the one or more of the plurality of advertisements are available for preemption, and wherein receiving the advertisement that is available for preempting comprises identifying the designation included in the advertisement.

4. The method of claim 1 wherein all of the plurality of advertisements included in the predefined day-part schedule are available for preemption.

5. The method of claim 1 further comprising:
providing a user interface to receive the rules for preempting advertisements; and
receiving the rules for preempting advertisements through the user interface.

6. The method of claim 1 wherein the preemption criteria further includes content of the advertisement and statistical information related to the advertisement.

7. The method of claim 1 wherein the preemption criteria further include a time of day for preemption.

8. The method of claim 1 wherein the preemption criteria further include a last time that the advertisement was played.

9. The method of claim 1 further comprising receiving an additional rule for preempting advertisements where programmatically evaluating the available inventory of preempting advertisements includes simultaneously programmatically evaluating the available inventory based on the rule and the additional rule.

10. The method of claim 1 where the advertisements are audio advertisements for distribution on a radio broadcast medium.

11. The method of claim 1 where the advertisements are multimedia advertisements for distribution on a television broadcast medium.

12. The method of claim 1, wherein the time period comprises one of a morning day-part, a midday day-part, an afternoon day-part, an evening day-part, or a weekend day-part.

13. The method of claim 3, wherein the designation is a tag included in the advertisement that is available for preempting.

14. The method of claim 13, wherein the tag includes a keyword included in a title of the advertisement.

15. The method of claim 13, wherein the tag defines a category representing the one or more of the plurality of advertisements that are available for preemption.

16. The method of claim 15 further comprising determining that the one or more of the plurality of advertisements belong to the category based on identifying the tag in all of the one or more of the plurality of advertisements.

17. The method of claim 9 wherein the rule and the additional rule specify different times of a day.

18. A system comprising
a hub;
a broadcast station; and
a preemption module including components distributed between the hub and the broadcast station, the preemption module operable to:
receiving a predefined day-part schedule comprising a time period other than a day, including a plurality of advertisements scheduled for playing at a corresponding plurality of time slots, the plurality of advertisements including an advertisement that is available for preemption, wherein preemption includes replacing an advertisement that was previously scheduled for playing at a corresponding time slot with a different advertisement,
receive rules for preempting advertisements, wherein the rules specify preemption criteria including a maximum number of the plurality of time slots available for preemption and a minimum price associated with a preempting advertisement,
programmatically evaluate an available inventory of preempting advertisements, each preempting advertisement included in the available inventory associated with a corresponding price, wherein each preempting advertisement is available to preempt an advertisement scheduled for playing at a corresponding time slot if the rules for preempting the advertisements are satisfied;
determining:
that a particular price associated with a particular preempting advertisement in the available inventory is greater than or equal to the minimum price specified in the rules for preempting, and
that a quantity of the plurality of time slots included with the predefined day-part schedule that correspond to advertisements that have been preempted is less than the maximum number of the plurality of time slots available for preemption for the predefined day-part schedule,
in response to the determining, preempting the advertisement that is available for preemption with the particular preempting advertisement, and
updating the schedule to include the particular preempting advertisement.

19. The system of claim 18 where the broadcast station is operable to tag advertisements in the predefined day-part schedule that can be preempted.

20. The system of claim 18 where the hub is a broadcasting hub and where the broadcast station is a regional broadcast studio of a radio communication system.

21. The system of claim 18 where the hub is a broadcasting hub and where the broadcast station is a regional broadcast studio of a television communication system.

22. The system of claim 18, wherein the time period comprises one of a morning day-part, a midday day-part, an afternoon day-part, an evening day-part, or a weekend day-part.

23. An apparatus comprising:
means for receiving a predefined day-part schedule comprising a time period other than a day, including a plurality of advertisements scheduled for playing at a corresponding plurality of time slots, the plurality of advertisements including an advertisement that is available for preemption, wherein preemption includes replacing an advertisement that was previously scheduled for playing at a corresponding time slot with a different advertisement;
means for receiving rules for preempting advertisements from a user, wherein the rules specify preemption criteria including a maximum number of the plurality of time slots available for preemption and a minimum price associated with a preempting advertisement;
programmatic means for evaluating an available inventory of preempting advertisements, each preempting advertisement included in the available inventory associated with a corresponding price, wherein each preempting advertisement is available to preempt an advertisement scheduled for playing at a corresponding time slot if the rules for preempting the advertisements are satisfied;
means for determining:
that a particular price associated with a particular preempting advertisement in the available inventory is greater than or equal to the minimum price specified in the rules for preempting, and
that a quantity of the plurality of time slots included with the predefined day-part schedule that correspond to advertisements that have been preempted is less than the maximum number of the plurality of time slots available for preemption for the predefined day-part schedule;

in response to the determining, means for preempting the advertisement that is available for preemption with the particular preempting advertisement; and means for updating the schedule to include the particular preempting advertisement in the schedule.

24. A method comprising:

determining, by a computing device, one or more advertisements in a predefined day-part schedule of advertisements comprising a time period other than a day for broadcasting, that are available for preemption, wherein the one or more advertisements are to be broadcast during a high volume traffic time;

providing, by the computing device, rules for preempting advertisements including preempting based on a minimum price prices associated with advertisements, a time of day, and a maximum number of allowed preemptions;

determining, by the computing device, that one or more preempting advertisements are available in an inventory, wherein each of the one or more advertisements in the schedule are preemptible with a preempting advertisement in the inventory if the rules for preempting advertisements are satisfied; and automatically preempting, by the computing device, the one or more advertisements in the schedule using the one or more preempting advertisements from the inventory if:

prices of the one or more preempting advertisements available in the inventory are higher than the minimum price, a maximum number of allowed preemptions for the predefined day-part schedule has not been exceeded, and the one or more advertisements in the scheduled are scheduled to be played during the time of day.

25. A computer program product tangibly stored in a non-transitory computer medium including instructions for causing a computing device to perform operations comprising:

identifying a predefined day-part schedule comprising a time period other than a day, including a plurality of advertisements for broadcasting, wherein one or more advertisements of the plurality of advertisements are available for preemption, wherein the one or more advertisements are to be broadcast during a high volume traffic time;

identifying a plurality of rules for preempting the identified advertisements, wherein each rule of the plurality of rules is configurable based on input from a user;

determining, by the computing device, that one or more preempting advertisements are available in an inventory, wherein a preempting advertisement replaces an advertisement of the plurality of advertisements in the schedule if the plurality of rules for preempting the identified advertisements is satisfied;

programmatically evaluating the one or more preempting advertisements available in the inventory based on the identified rules to determine:

that a particular price associated with a particular preempting advertisement in the plurality of advertisements is greater than or equal to a minimum price associated with a preempting advertisement, and that a quantity of a plurality of time slots included with the predefined day-part schedule that correspond to advertisements that have been preempted is less than a maximum number of the plurality of time slots available for preemption for the predefined day-part schedule; and preempting an advertisement included in the schedule with the particular preempting advertisement, in response to the programmatically evaluating.

* * * * *

UNITED STATES PATENT AND TRADEMARK OFFICE
CERTIFICATE OF CORRECTION

| | | |
|---|---|---|
| PATENT NO. | : 8,468,561 B2 | Page 1 of 1 |
| APPLICATION NO. | : 11/502592 | |
| DATED | : June 18, 2013 | |
| INVENTOR(S) | : Ketchum et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1159 days.

Signed and Sealed this
Thirtieth Day of December, 2014

Michelle K. Lee
*Deputy Director of the United States Patent and Trademark Office*